(12) United States Patent
Morthorst et al.

(10) Patent No.: US 10,018,235 B2
(45) Date of Patent: Jul. 10, 2018

(54) HYDRAULIC SUPPLY APPARATUS

(71) Applicant: VOLKSWAGEN AKTIENGESELLSCHAFT, Wolfsburg (DE)

(72) Inventors: Bernd Morthorst, Braunschweig (DE); Jens Struckmann, Braunschweig (DE); Christian Minx, Braunschweig (DE); Martin Langer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 483 days.

(21) Appl. No.: 14/719,449

(22) Filed: May 22, 2015

(65) Prior Publication Data

US 2015/0337914 A1 Nov. 26, 2015

(30) Foreign Application Priority Data

May 23, 2014 (DE) .......................... 10 2014 209 856

(51) Int. Cl.
*F16D 48/06* (2006.01)
*F16D 48/02* (2006.01)
(Continued)

(52) U.S. Cl.
CPC ............ *F16D 48/066* (2013.01); *F15B 1/033* (2013.01); *F16D 25/123* (2013.01); *F16D 25/14* (2013.01);
(Continued)

(58) Field of Classification Search
CPC ................................ F15B 1/033; F16D 48/066
See application file for complete search history.

(56) References Cited

U.S. PATENT DOCUMENTS 3,905,459 A * 9/1975 Liebich .................. B63H 23/08
138/30
4,924,983 A * 5/1990 Katayama ............. F16D 48/066
192/103 C
(Continued)

FOREIGN PATENT DOCUMENTS

CN 102292574 A 12/2011
CN 102483151 A 5/2012
(Continued)

OTHER PUBLICATIONS

The First Office Action issued by the State Intellectual Property Office of People's Republic of China, dated Sep. 21, 2016, for Chinese Patent Application No. 201510266098.X which is related to U.S. Appl. No. 14/719,449; with English language translation.
(Continued)

*Primary Examiner* — F. Daniel Lopez
(74) *Attorney, Agent, or Firm* — Manfred Beck, P.A.

(57) ABSTRACT

A hydraulic supply apparatus for an automatic or automated transmission of a motor vehicle includes a high-pressure circuit which has a pressure accumulator and is supplied through the use of a high-pressure pump, a low-pressure circuit which is supplied through the use of a low-pressure pump, wherein the high-pressure pump and the low-pressure pump are driven by a common drive unit, and a valve which is provided downstream of the high-pressure pump. The valve has three switching positions, wherein a supply to the high-pressure circuit by the high-pressure pump is possible in the first switching position, and the output end of the high-pressure pump is connected to a reservoir or to the input end of the high-pressure pump in the second switching position. The high-pressure circuit is connected to the reservoir in the third switching position of the valve.

9 Claims, 2 Drawing Sheets

(51) Int. Cl.
*F15B 1/033* (2006.01)
*F16D 25/12* (2006.01)
*F16H 61/02* (2006.01)
*F16H 61/00* (2006.01)

(52) U.S. Cl.
CPC ......... *F16D 48/02* (2013.01); *F16H 61/0031* (2013.01); *F16H 61/0206* (2013.01); *F16D 2048/0203* (2013.01); *F16D 2048/0221* (2013.01)

(56) References Cited

U.S. PATENT DOCUMENTS

| | | | | |
|---|---|---|---|---|
| 5,992,590 | A | * | 11/1999 | Harries ................ F04B 49/035 192/3.58 |
| 2004/0211378 | A1 | | 10/2004 | Diehl et al. |
| 2009/0321209 | A1 | | 12/2009 | Grethel et al. |
| 2011/0314944 | A1 | | 12/2011 | Brandenburg |
| 2012/0060488 | A1 | | 3/2012 | Grethel et al. |
| 2014/0345261 | A1 | | 11/2014 | Schuller et al. |
| 2014/0373524 | A1 | | 12/2014 | Schuller et al. |

FOREIGN PATENT DOCUMENTS

| | | |
|---|---|---|
| CN | 103502695 A | 1/2014 |
| CN | 103502696 A | 1/2014 |
| DE | 102 19 786 A1 | 11/2003 |
| DE | 10 2008 009 653 A1 | 9/2008 |
| DE | 10 2009 005 756 A1 | 7/2010 |
| DE | 10 2010 018 192 A1 | 12/2010 |
| DE | 10 2010 032 657 A1 | 2/2011 |
| DE | 10 2011 100 796 A1 | 11/2012 |
| EP | 1 420 185 A2 | 5/2004 |

OTHER PUBLICATIONS

Search Report including Provisional Assessment of Patentability issued by the German Patent and Trademark Office for German Patent Application No. DE 10 2014 209 856.4, dated Mar. 25, 2015.

* cited by examiner

HYDRAULIC SUPPLY APPARATUS

CROSS-REFERENCE TO RELATED APPLICATIONS

This application claims the priority, under 35 U.S.C. § 119, of German Patent Application No. DE 10 2014 209 856.4, filed May 23, 2014; the prior application is herewith incorporated by reference in its entirety.

BACKGROUND OF THE INVENTION

Field of the Invention

The invention relates to a hydraulic supply apparatus for an automatic or automated transmission of a motor vehicle, wherein the hydraulic supply apparatus includes a high-pressure circuit which has a pressure accumulator and is supplied through the use of a high-pressure pump, a low-pressure circuit which is supplied through the use of a low-pressure pump, wherein the high-pressure pump and the low-pressure pump are driven by a common drive unit, and a valve which is provided downstream of the high-pressure pump and has at least two switching positions, wherein the supply of the high-pressure circuit through the use of the high-pressure pump is possible in the first switching position, and the output end of the high-pressure pump is connected to a reservoir or to the input end of the high-pressure pump in the second switching position.

European Patent Application No, EP 1 420 185 A2 discloses a generic hydraulic supply apparatus of a motor vehicle transmission, including a high-pressure circuit and a low-pressure circuit, wherein each circuit is supplied with a fluid through the use of a pump. Both pumps are simultaneously driven by a common drive unit. A valve which has two switching positions is arranged in each circuit downstream of each pump. In the first switching position, the output end of the pump is connected to the associated pressure circuit and the pump supplies the pressure circuit with the fluid. When fluid is required in one pressure circuit and no fluid is required or there is enough pressure in the other pressure circuit, the valve is moved to its second switching position in the pressure circuit which does not require the fluid. In the second switching position, the output end of the pump is connected to the input end of the pump, and therefore the pump idles and does not supply any fluid to this pressure circuit. Therefore, the energy consumption by the pump has fallen and is much lower than when the pump has to push the excess fluid through a pressure-limiting valve. Two variant embodiments of the valve and of the flow connection of the pressure circuit are disclosed, wherein both variant embodiments have considerable disadvantages. In the first variant, the associated pressure circuit is also connected to the input end of the pump or, respectively, the reservoir in the second switching position. This leads to this pressure circuit being completely pressureless in this switching position and the pump of the pressure circuit having to build up the pressure once again when pressure is required. The pump therefore has to be switched on very often and for long periods of time, this leading to a high level of energy consumption.

In the second variant, the associated pressure circuit is disconnected from the output end of the pump in the second switching position of the valve. The pressure is maintained in the pressure circuit until it is reduced below a threshold owing to the consumption of fluid by the consumers. Only then does the pump have to be connected again. One disadvantage of this variant is that a controlled reduction of pressure in the pressure circuit is no possible. The pressure which is maintained, in particular, in the high-pressure circuit can then have a damaging effect on the no longer moving valves in this pressure circuit when the motor vehicle is turned off. A similar arrangement of the valve is also known from German Patent Application No. DE 10 2010 018 192 A1, wherein the high-pressure circuit is equipped with a pressure accumulator in this case. As a result, the necessary delivery time of the pump is reduced, but at the same time the described disadvantage becomes more apparent because the pressure acts on the valves at a higher level for a longer period of time.

SUMMARY OF THE INVENTION

It is accordingly an object of the invention to provide a hydraulic supply apparatus which overcomes the above-mentioned disadvantages of the heretofore-known hydraulic supply apparatuses of this general type. In particular, it is an object of the invention to provide a hydraulic supply apparatus having a high-pressure circuit and a low-pressure circuit that exhibits a low level of loss and is energy-efficient and that allows a deliberate reduction in pressure in the high-pressure circuit.

With the foregoing and other objects in view there is provided, in accordance with the invention, a hydraulic supply apparatus for an automatic or automated transmission of a motor vehicle, including:

a high-pressure pump having an input end and an output end;

a high-pressure circuit having a pressure accumulator, the high-pressure circuit being supplied through the use of the high-pressure pump;

a low-pressure pump;

a low-pressure circuit, the low pressure circuit being supplied through the use of the low-pressure pump;

a common drive unit, the high-pressure pump and the low-pressure pump being driven by the common drive unit;

a reservoir; and a valve provided downstream of the high-pressure pump, the valve having a first switching position, a second switching position, and a third switching position, wherein, in the first switching position, a supply to the high-pressure circuit through the use of the high-pressure pump is facilitated, wherein, in the second switching position, the output end of the high-pressure pump is connected to the reservoir or to the input end of the high-pressure pump, and wherein, in the third switching position, the high-pressure circuit is connected to the reservoir.

In other words, in accordance with the invention, there is provided a hydraulic supply apparatus for an automatic or automated transmission in particular a dual-clutch transmission of a motor vehicle, including a high-pressure circuit which has a pressure accumulator and is supplied through the use of a high-pressure pump; a low-pressure circuit which is supplied through the use of a low-pressure pump, wherein the high-pressure pump and the low-pressure pump are driven by a common drive unit; and a valve which is provided downstream of the high-pressure pump and has at least two switching positions, wherein the supply to the high-pressure circuit through the use of the high-pressure pump is possible in the first switching position and wherein the output end of the high-pressure pump is connected to a reservoir or to the input end of the high-pressure pump in the second switching position, and wherein the valve has a third switching position in which the high-pressure circuit is connected to the reservoir.

When required, typically after the motor vehicle is turned off, the valve can be moved to this switching position, as a result of which the pressure in the high-pressure circuit can be reduced. As a result, the valves and other components of the high-pressure circuit are relieved and the service life thereof is extended. An additional valve is not required, as a result of which the apparatus is simple, cost-effective and not susceptible to malfunctioning. Actuators which operate a clutch or clutches and switching cylinders are usually supplied by the high-pressure circuit. The valve may optionally also be used as a safety valve by way of which the high-pressure circuit is emptied in an emergency, in the case of failure of a control valve, during operation of the motor vehicle, in order to disconnect the drive train, for example, in the case of an actively closed clutch.

According to another feature of the invention, the hydraulic supply apparatus includes a first pressure line, a second pressure line, a third pressure line, and a fourth pressure line; the valve has a first connection, a second connection, and a third connection; the output end of the high-pressure pump is connected to the first connection of the valve via the first pressure line and is connected to the high-pressure circuit via the second pressure line; a non-return valve is provided in the second pressure line; the high-pressure circuit is connected to the second connection of the valve via the third pressure line; the third connection of the valve is connected to the reservoir or to the input end of the high-pressure pump via the fourth pressure line; and the first connection and the second connection are closed in the first switching position of the valve and, in the second switching position of the valve, the first connection is connected to the third connection and the second connection is closed. In other words, the hydraulic supply apparatus is configured such that the output end of the high-pressure pump is connected to a first connection of the valve via a first pressure line, and is connected to the high-pressure circuit via a second pressure line, wherein a non-return valve is provided in the second pressure line, such that the high-pressure circuit is connected to a second connection of the valve via a third pressure line, such that the valve has a third connection which is connected to the reservoir or to the input end of the high-pressure pump via a fourth pressure line, wherein the first connection and the second connection are closed in the first switching position of the valve, and the first connection is connected to the third connection and the second connection is closed in the second switching position of the valve.

According to a further feature of the invention, the first connection is connected to the third connection in the third switching position of the valve.

According to another feature of the invention, the valve has a fourth connection; the fourth connection is connected to the reservoir; and the second connection is connected to the fourth connection in the third switching position of the valve.

According to yet another feature of the invention, the hydraulic supply apparatus includes a first pressure line, a second pressure line, and a third pressure line; the valve has a first connection, a second connection, and a third connection; the output end of the high-pressure pump is connected to the first connection of the valve via the first pressure line; the high-pressure circuit is connected to the second connection of the valve via the second pressure line; the third connection of the valve is connected to the reservoir or to the input end of the high-pressure pump via the third pressure line; and the first connection of the valve is connected to the second connection of the valve in the first switching position of the valve and, in the second switching position of the valve, the first connection of the valve is connected to the third connection of the valve and the second connection of the valve is closed. In other words, the hydraulic supply apparatus is configured such that the output end of the high-pressure pump is connected to a first connection of the valve via a first pressure line, the high-pressure circuit is connected to a second connection of the valve via a second pressure line, such that the valve has a third connection which is connected to the reservoir or to the input end of the high-pressure pump via a third pressure line, wherein the first connection is connected to the second connection in the first switching position of the valve, and the first connection is connected to the third connection and the second connection is closed in the second switching position of the valve.

According to a further feature of the invention, the first connection of the valve is connected to the third connection of the valve in the third switching position of the valve.

According to another feature of the invention, the valve has a fourth connection; the fourth connection is connected to the reservoir; and the second connection of the valve is connected to the fourth connection of the valve in the third switching position of the valve.

According to yet another feature of the invention, a non-return valve is provided in the first pressure line.

According to a further feature of the invention, the first connection of the valve is connected to the third connection of the valve in the third switching position of the valve.

With the objects of the invention in view there is also provided, a motor vehicle, including a transmission selected from the group including an automatic transmission and an automated transmission; the transmission has a hydraulic supply apparatus including a high-pressure pump, a high-pressure circuit, a low-pressure pump, a low-pressure circuit, a common drive unit, a reservoir, and a valve provided downstream of the high-pressure pump; the high-pressure pump has an input end and an output end; the high-pressure circuit has a pressure accumulator and is supplied through the use of the high-pressure pump; the low pressure circuit is supplied through the use of the low-pressure pump; the high-pressure pump and the low-pressure pump are driven by the common drive unit; and the valve has a first switching position, a second switching position, and a third switching position, wherein, in the first switching position, a supply to the high-pressure circuit through the use of the high-pressure pump is facilitated, wherein, in the second switching position, the output end of the high-pressure pump is connected to the reservoir or to the input end of the high-pressure pump, and wherein, in the third switching position, the high-pressure circuit is connected to the reservoir.

In accordance with the invention, there is thus provided a motor vehicle having an automatic or automated transmission with a hydraulic supply apparatus having the features defined above.

There are different possible ways of configuring and refining the supply apparatus. In this respect, reference is first made to the embodiments above described and defined in the dependent patent claims. Preferred embodiments of the hydraulic supply apparatus will be explained in greater detail below with reference to the drawing and the associated description.

Other features which are considered as characteristic for the invention are set forth in the appended claims.

Although the invention is illustrated and described herein as embodied in a hydraulic supply apparatus for an automatic or automated transmission and in a corresponding motor vehicle it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
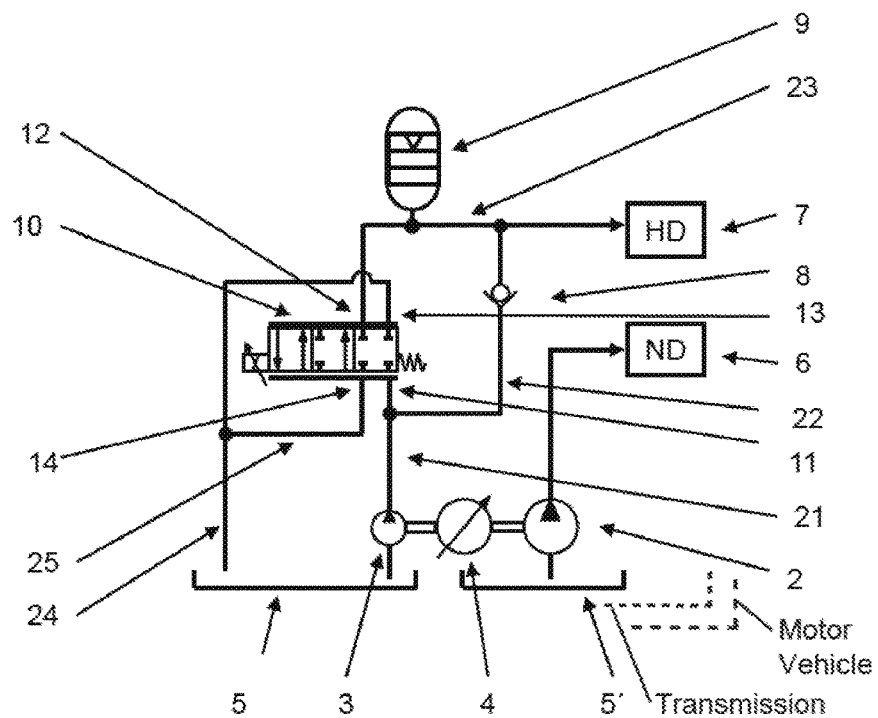
FIG. 1 is a schematic view of a hydraulic supply apparatus shown in the form of a schematic hydraulic plan in accordance with a first exemplary embodiment of the invention.

Referring now to the figures of the drawings in detail and first, particularly, to FIG. 1 thereof, there is shown a hydraulic supply apparatus 1 for an automated transmission of a motor vehicle. The transmission and the motor vehicle are only schematically indicated by dashed lines. The automated transmission is in particular in the form of a dual-clutch transmission. The hydraulic supply apparatus 1 is appropriately configured and suitable for the dual-clutch transmission. The hydraulic supply apparatus 1 has a high-pressure circuit 7 including a pressure accumulator 9 which is supplied through the use of a high-pressure pump 3. Furthermore, the hydraulic supply apparatus has a low-pressure circuit 6 which is supplied through the use of a low-pressure pump 2. The high-pressure circuit 7 serves to hydraulically operate a clutch and shifting configuration (mechatronics) (not shown) with pressurized oil, and the low-pressure circuit 6 feeds the clutch configuration, possibly the transmission, with cooling oil and/or lubricating oil. The high-pressure pump 3 and the low-pressure pump 2 are driven by a common drive unit 4, preferably an electric motor. The electric motor is advantageously an electronically commutated (EC) motor and can be driven at any desired rotation speed. The low-pressure pump 2 and the high-pressure pump 3 can be two separate pumps, a dual pump with high- and low-pressure tooth systems, or two stages of a single two-stage tandem pump. The input ends of both pumps are connected to a reservoir 5, 5', wherein filter devices and/or cooling devices can possibly also be connected upstream of the pumps. Both pumps can be connected to a single common reservoir or, as shown in this exemplary embodiment, the high-pressure pump 3 can be connected to a reservoir 5 and the low-pressure pump 2 can be connected to a reservoir 5'. A valve 10 which has at least three switching positions is provided downstream of the high-pressure pump 3. The valve 10 is advantageously an electromagnetically operated slide valve, but may also be hydraulically operated. The output end of the high-pressure pump 3 is connected to a first connection 11 of the valve 10 via a first pressure line 21, and to the high-pressure circuit 7 via a second pressure line 22, wherein a non-return valve 8 is provided in the second pressure line 22. The high-pressure circuit 7 is connected to a second connection 12 of the valve 10 via a third pressure line 23 to which the pressure accumulator 9 is connected. The valve 10 has a third connection 13 which is connected to the reservoir 5 via a fourth pressure line 24. The fourth pressure line 24 can also connect the third connection 13 to the input end of the high-pressure pump 3. Furthermore, the valve 10 has a fourth connection 24 which is connected to the reservoir 5. The fourth connection 14 is connected to the reservoir 5 via a fifth pressure line 25 and via the fourth pressure line 24, wherein the fifth line 25 can also separately open directly into the reservoir 5. In a particularly simple variant embodiment, the valve 10 can be a 3/3 valve, wherein the third connection 13 and the fourth connection 14 are connected, and are flow-connected to the reservoir.

The first connection 11 and the second connection 12 are closed in the first switching position of the valve 10 which is advantageously spring-prestressed. The oil is fed from the output end of the high-pressure pump 3, through the first pressure line 11 and via the non-return valve 8, through the second pressure line 22, to the high-pressure circuit 7 and the pressure accumulator 9. Therefore, the supply to the high-pressure circuit 7 through the use of the high-pressure pump 3 is possible.

If the pressure in the high-pressure circuit is sufficient and the cooling/lubricating oil is required, the valve 10 is moved to its second switching position. The first connection 11 is connected to the third connection 13 and the second connection 12 is closed in this switching position of the valve 10. As a result, the output end of the high-pressure pump 3 is connected to the reservoir 5, the high-pressure pump 3 does not build up any pressure and consumes only little energy. The pressure is maintained in the high-pressure circuit 7 because the second pressure line 22 is closed through the use of the non-return valve 8, and the third pressure line 23 is closed through the use of the valve 10. The low-pressure pump 2 can deliver the oil to the low-pressure circuit 6.

In the third switching position of the valve 10, the second connection 12 is connected to the fourth connection 14, as a result of which the high-pressure circuit 7 is connected to the reservoir 5 via the third pressure line 23 and the pressure accumulator 9 is emptied. The pressure in the high-pressure circuit 7 is reduced to a desired level and, advantageously to the ambient pressure. As a result, the valves and other components of the high-pressure circuit are relieved and the service life thereof is extended.

The valve 10 can also be provided such that it does not have a fourth connection 14 and that the second connection 12 is connected to the third connection 13 in the third switching position of the valve.

The output end of the high-pressure pump 3 can advantageously be connected to the input end of the high-pressure pump or to the reservoir 5 in the third switching position of the valve 10. In this switching position of the valve 10, the first connection 11 is connected to the third connection 13 and as a result the output end of the high-pressure pump 3 is connected to the reservoir 5 via the first pressure line 21 and the fourth pressure line 24. This allows a rapid decrease in pressure in the high-pressure circuit 7 even when the high-pressure pump 3 is running, that is to say during operation of the motor vehicle. Therefore, the valve 10 can also be used as a safety valve. It goes without saying that the first connection 11 can also be connected to the fourth connection 14.

Figure 2:
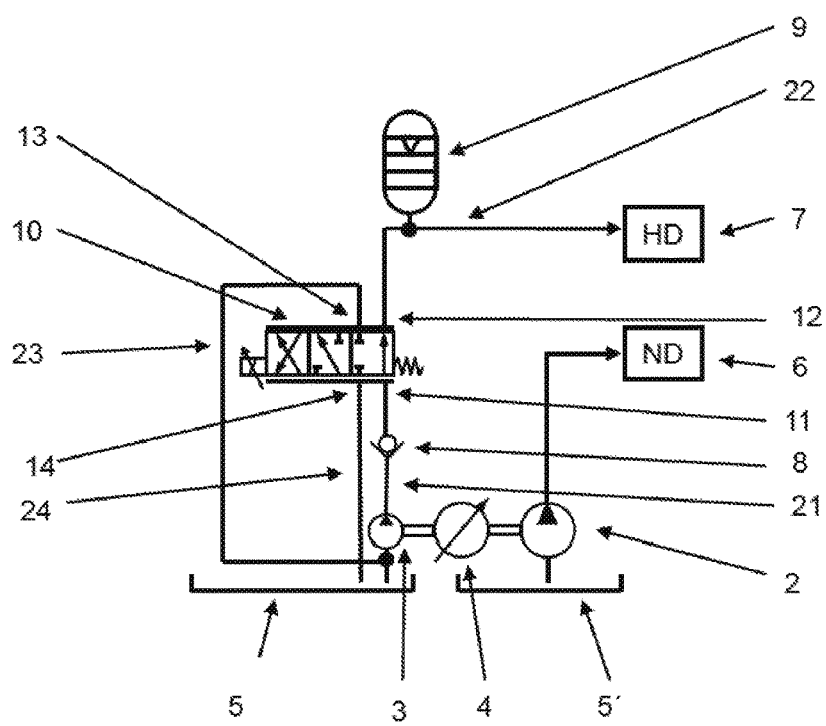
FIG. 2 is a schematic view of a hydraulic supply apparatus shown in the form of a schematic hydraulic plan in accordance with a second exemplary embodiment of the invention.
Figure 3:
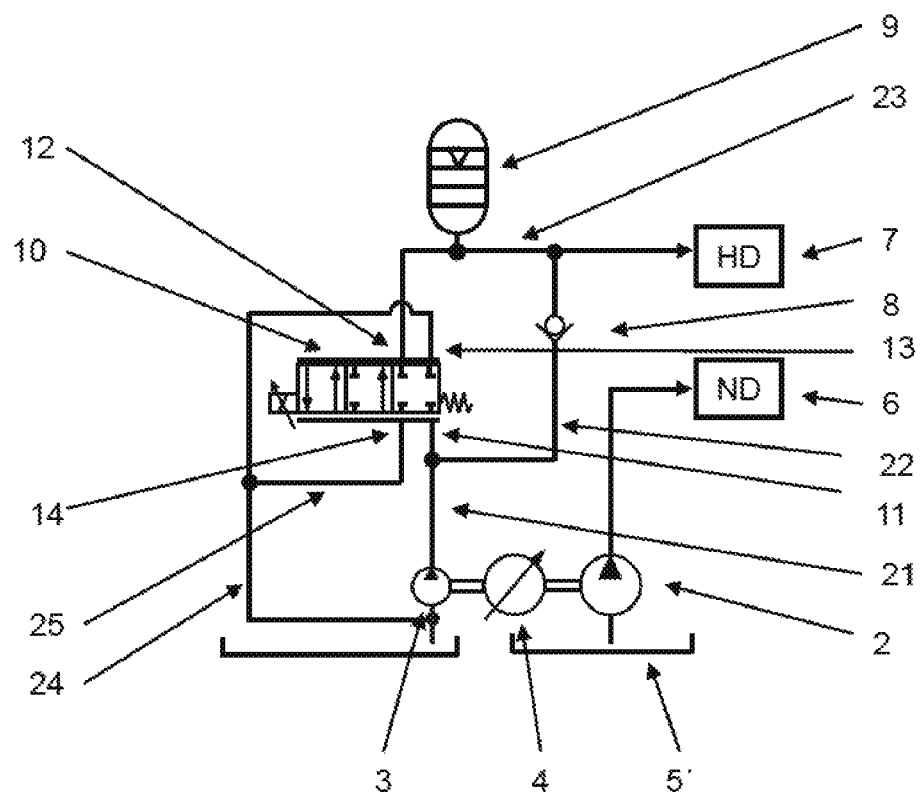
FIG. 3 is a schematic view of a hydraulic supply apparatus shown in the form of a schematic hydraulic plan in accordance with an exemplary embodiment of the invention with the input end of the high-pressure pump connected to a pressure line.

FIG. 2 shows a second exemplary embodiment of the hydraulic supply apparatus 1 according to the invention. Only the differences from FIG. 1 will be discussed.

The output end of the high-pressure pump 3 is connected to a first connection 11 of the valve 10 via a first pressure line 11, wherein a non-return valve 8 is provided in the first pressure line 21. A high-pressure circuit 7 is connected to a second connection 12 of the valve 10 via a second pressure line 22 to which the pressure accumulator 9 is also connected. The valve has a third connection 13 which is connected to the input end of the high-pressure pump 3 via a third pressure line 23. However, the third connection 13 can also be connected to the reservoir 5. Furthermore, the valve 10 has a fourth connection 14 which is connected to the reservoir 5.

In the first advantageously spring-prestressed switching position of the valve 10, the first connection 11 is connected to the second connection 12. The oil is fed from the output end of the high-pressure pump 3, through the first pressure line 11, via the non-return valve 8 and the valve 10, and through the second pressure line 22, to the high-pressure circuit 7 and the pressure accumulator 9. Therefore, the supply to the high-pressure circuit 7 through the use of the high-pressure pump 3 is possible.

In the second switching position of the valve 10, the first connection 11 is connected to the third connection 13 and the second connection 12 is closed. As a result, the output end of the high-pressure pump 3 is connected to the input end of the high-pressure pump, the high-pressure pump does not build up any pressure and consumes only little energy. The pressure is maintained in the high-pressure circuit 7 because the second pressure line 22 is closed through the use of the valve 10. The low-pressure pump can deliver the oil to the low-pressure circuit 6.

In the third switching position of the valve 10, the second connection 12 is connected to the fourth connection 14. The high-pressure circuit 7 is connected to the reservoir 5 via the second pressure line 22 and the fourth pressure line 24, and the pressure accumulator 9 is emptied. The pressure in the high-pressure circuit 7 is reduced to a desired level. Advantageously, in the third switching position of the valve 10, the output end of the high-pressure pump 3 is connected to the input end of the high-pressure pump or to the reservoir 5. In this switching position of the valve 10, the first connection 11 is connected to the third connection 13 and as a result the output end of the high-pressure pump 3 is connected to the input end of the high-pressure pump 3 via the first pressure line 21 and the third pressure line 23. This allows a rapid reduction in pressure in the high-pressure circuit 7 even when the drive unit 4 is driving the pumps. Therefore, the valve 10 can also be used as a safety valve. It goes without saying that the first connection 11 can also be connected to the fourth connection 14.

In a modified embodiment, the fourth connection 14 of the valve 10 and the fourth pressure line 24 can be dispensed with, wherein the second connection 12 is connected to the third connection 13 in the third switching position of the valve 10. The pressure in the pressure accumulator 9 of the high-pressure circuit 7 is then reduced via the third line. In the case of this modification, it is advantageous for the third pressure line 23 to be connected to the reservoir 5 in order to allow an unrestricted reduction in pressure.

The variant shown in FIG. 1 with the connected fourth pressureline 24 and fifth pressure line 25 has the advantage that the hydraulic supply device 1 and, respectively, the automated transmission can be tested on a test rig by the fourth line 24 being connected to an external pressure supply. The high-pressure circuit 7 is supplied with the necessary pressure, independently of the pump rotation speed, by the lines which are pressureless during normal operation. As a result, it is possible to accept valves (for example gear actuator valves) in the high-pressure circuit 7 which are subjected to intensive volumetric flow rates and for which the reserved volume of oil in the pressure accumulator 9 is not sufficient for recording a continuous characteristic curve. It goes without saying that it is also possible in the second exemplary embodiment according to FIG. 2 for the third pressure line 23 and the fourth pressure line 24 to be correspondingly connected, wherein they are then not connected to the input end of the high-pressure pump 3 but rather to the reservoir 5.

The expression "pressure line" is not intended to be understood in such a narrow sense that it has to be a pipe or a closed channel—in an extreme variant, the pressure lines which are connected to the reservoir 5 can be realized merely by the connections of the valve, and the emerging oil then enters the reservoir in a pressureless state.

If the pressure lines (for example the fourth pressure line 24 in FIG. 1 and the third pressure line 23 in FIG. 2) which relieve the first pressure line 11 are connected to the input end of the high-pressure pump 3, it is advantageous to configure the relief lines for the reduction in pressure in the high-pressure circuit 7 (for example the fifth pressure line 25 in FIG. 1 and the fourth pressure line 24 in FIG. 2) separately from these pressure lines. Various filter devices which generate a certain resistance to pressure are usually provided between the input end of the high-pressure pump 3 and the reservoir 5. The reduction in pressure in the high-pressure circuit 7 can be carried out more quickly and independently of the current state of the filter device by virtue of a direct connection to the reservoir 5 or, respectively, to the ambient pressure.

What is claimed is:

1. A hydraulic supply apparatus for an automatic or automated transmission of a motor vehicle, comprising:
   a high-pressure pump having an input end and an output end;
   a high-pressure circuit having a pressure accumulator, said high-pressure circuit being supplied through use of said high-pressure pump;
   a low-pressure pump;
   a low-pressure circuit, said low pressure circuit being supplied through use of said low-pressure pump;
   a common drive unit, said high-pressure pump and said low-pressure pump being driven by said common drive unit;
   a reservoir;
   a valve provided downstream of said high-pressure pump, said valve having a first switching position, a second switching position, and a third switching position, wherein, in the first switching position, a supply to said high-pressure circuit through use of said high-pressure pump is facilitated, wherein, in the second switching position, said output end of said high-pressure pump is connected to one of said reservoir and said input end of said high-pressure pump, and wherein, in the third switching position, said high-pressure circuit is connected to said reservoir;
   a first pressure line;
   a second pressure line;
   a third pressure line;

a fourth pressure line;
said valve having a first connection, a second connection, and a third connection;
said output end of said high-pressure pump being connected to said first connection of said valve via said first pressure line and being connected to said high-pressure circuit via said second pressure line;
a non-return valve provided in said second pressure line;
said high-pressure circuit being connected to said second connection of said valve via said third pressure line;
said third connection of said valve being connected to one of said reservoir and said input end of said high-pressure pump via said fourth pressure line; and
said first connection and said second connection being closed in the first switching position of said valve and, in the second switching position of said valve, said first connection being connected to said third connection and said second connection being closed.

2. The hydraulic supply apparatus according to claim 1, wherein said first connection is connected to said third connection in the third switching position of said valve.

3. The hydraulic supply apparatus according to claim 1, wherein:
said valve has a fourth connection;
said fourth connection is connected to said reservoir; and
said second connection is connected to said fourth connection in the third switching position of said valve.

4. The hydraulic supply apparatus according to claim 1, wherein, in the third switching position of said valve, said first connection of said valve is connected to said third connection of said valve.

5. A motor vehicle, comprising:
a transmission selected from the group consisting of an automatic transmission and an automated manual transmission;
said transmission having a hydraulic supply apparatus including a high-pressure pump; a high-pressure circuit, a low-pressure pump, a low-pressure circuit, a common drive unit, a reservoir, and a valve provided downstream of said high-pressure pump;
said high-pressure pump having an input end and an output end;
said high-pressure circuit having a pressure accumulator and being supplied through use of said high-pressure pump;
said low pressure circuit being supplied through use of said low-pressure pump;
said high-pressure pump and said low-pressure pump being driven by said common drive unit;
said valve having a first switching position, a second switching position, and a third switching position, wherein, in the first switching position, a supply to said high-pressure circuit through use of said high-pressure pump is facilitated, wherein, in the second switching position, said output end of said high-pressure pump is connected to one of said reservoir and said input end of said high-pressure pump, and wherein, in the third switching position, said high-pressure circuit is connected to said reservoirs;
a first pressure line;
a second pressure line;
a third pressure line;
a fourth pressure line;
said valve having a first connection, a second connection, and a third connection;
said output end of said high-pressure pump being connected to said first connection of said valve via said first pressure line and being connected to said high-pressure circuit via said second pressure line;
a non-return valve provided in said second pressure line;
said high-pressure circuit being connected to said second connection of said valve via said third pressure line;
said third connection of said valve being connected to one of said reservoir and said input end of said high-pressure pump via said fourth pressure line; and
said first connection and said second connection being closed in the first witching position of said valve and, in the second switching position of said valve, said first connection being connected to said third connection and said second connection being closed.

6. A hydraulic supply apparatus for an automatic or automated transmission of a motor vehicle, comprising:
a high-pressure pump having an input end and an output end;
a high-pressure circuit having a pressure accumulator, said high-pressure circuit being supplied through use of said high-pressure pump;
a low-pressure pump;
a low-pressure circuit, said low pressure circuit being supplied through use of said low-pressure pump;
a common drive unit, said high-pressure pump and said low-pressure pump being driven by said common drive unit;
a reservoir;
a valve provided downstream of said high-pressure pump, said valve having a first switching position, a second switching position, and a third switching position, wherein, in the first switching position, a supply to said high-pressure circuit through use of said high-pressure pump is facilitated, wherein, in the second switching position, said output end of said high-pressure pump is connected to one of said reservoir and said input end of said high-pressure pump, and wherein, in the third switching position, said high-pressure circuit is connected to said reservoir;
a first pressure line;
a second pressure line;
a third pressure line;
said valve having a first connection, a second connection, and a third connection;
said output end of said high-pressure pump being connected to said first connection of said valve via said first pressure line;
said high-pressure circuit being connected to said second connection of said valve via said second pressure line;
said third connection of said valve being connected to one of said reservoir and said input end of said high-pressure pump via said third pressure line; and
said first connection of said valve being connected to said second connection of said valve in the first switching position of said valve and, in the second switching position of said valve, said first connection of said valve being connected to said third connection of said valve and said second connection of said valve being closed.

7. The hydraulic supply apparatus according to claim 6, wherein, in the third switching position of said valve, said first connection of said valve is connected to said third connection of said valve.

8. The hydraulic supply apparatus according to claim 6, wherein;
said valve has a fourth connection;
said fourth connection is connected to said reservoir; and said second connection of said valve is connected to said fourth connection of said valve in the third switching position of said valve.

9. The hydraulic supply apparatus according to claim 6, including a non-return valve provided in said first pressure line.

\* \* \* \* \*